United States Patent
Ferencz, Jr. et al.

(10) Patent No.: US 10,805,400 B2
(45) Date of Patent: *Oct. 13, 2020

(54) MONITORING AND CONTROLLING OF DISTRIBUTED MACHINES

(71) Applicant: Cattron North America, Inc., Warren, OH (US)

(72) Inventors: Donald Cyril Ferencz, Jr., Ceveland, OH (US); Kevin David Hostelley, Strongsville, OH (US); Justin Wesley Conrad, Columbiana, OH (US)

(73) Assignee: CATTRON NORTH AMERICA, INC., Warren, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/721,399

(22) Filed: Dec. 19, 2019

(65) Prior Publication Data

US 2020/0128080 A1 Apr. 23, 2020

Related U.S. Application Data

(63) Continuation of application No. 15/197,276, filed on Jun. 29, 2016, now Pat. No. 10,516,737.

(Continued)

(51) Int. Cl.
*H04L 29/08* (2006.01)
*B61L 27/00* (2006.01)
(Continued)

(52) U.S. Cl.
CPC .............. *H04L 67/12* (2013.01); *B61L 3/127* (2013.01); *B61L 15/0018* (2013.01);
(Continued)

(58) Field of Classification Search
CPC .......... H04L 67/12; H04L 51/06; B61L 3/127; B61L 27/0094; B61L 27/0005;
(Continued)

(56) References Cited

U.S. PATENT DOCUMENTS

| 9,036,509 B1 | 5/2015 | Addepalli |
| 9,678,214 B2 | 6/2017 | Harter |

(Continued)

FOREIGN PATENT DOCUMENTS

| CN | 1949720 A | 4/2007 |
| EP | 2648389 A1 | 10/2013 |

OTHER PUBLICATIONS

International Search Report and Written Opinion dated Sep. 23, 2016 for PCT/US2016/040133 filed Jun. 29, 2016 which claims priority to the same parent application as the instant application, 11 pages.

(Continued)

*Primary Examiner* — Aaron N Strange
(74) *Attorney, Agent, or Firm* — Harness, Dickey & Pierce, P.L.C.; Anthony G. Fussner (57) ABSTRACT

Exemplary embodiments are disclosed of apparatus and methods for monitoring and controlling distributed machines. In an exemplary embodiment, a network includes machines each having sensor(s) and/or actuator(s). Each machine has a node resident on the machine and/or in communication with the machine and that provides raw data from the sensor(s) and/or actuator(s). Each node has a network interface, and a processor and memory configured as a node agent to embed the raw data in message(s) without reformatting the raw data. An engine receives and reformats messages from the node agents without reformatting raw data embedded in the messages. The engine directs the reformatted messages including the raw data to user device(s) for use in managing machine activity and/or status. The engine also sends a message from a user device to a node of a given machine, for use in controlling activity and/or status of the given machine.

20 Claims, 9 Drawing Sheets

Related U.S. Application Data (60) Provisional application No. 62/187,007, filed on Jun. 30, 2015.

(51) Int. Cl.
   *H04L 12/58* (2006.01)
   *B61L 15/00* (2006.01)
   *B61L 3/12* (2006.01)
   *G16Y 10/40* (2020.01)

(52) U.S. Cl.
   CPC ....... *B61L 15/0072* (2013.01); *B61L 27/0005* (2013.01); *B61L 27/0077* (2013.01); *B61L 27/0094* (2013.01); *G16Y 10/40* (2020.01); *H04L 51/06* (2013.01); *B61L 2027/005* (2013.01)

(58) Field of Classification Search
   CPC ............ B61L 15/0018; B61L 15/0072; B61L 27/0077; B61L 2027/005; B61L 2205/04; B61L 25/025; B61L 17/02; G16Y 10/40; G16Y 20/10; G16Y 20/20
   See application file for complete search history.

(56) References Cited

U.S. PATENT DOCUMENTS

| | | | |
|---|---|---|---|
| 9,761,138 B2 | 9/2017 | Harter | |
| 10,516,737 B2 | 12/2019 | Ferencz, Jr. et al. | |
| 2001/0044681 A1 | 11/2001 | Diana et al. | |
| 2002/0059018 A1* | 5/2002 | Brousseau | B61L 3/127 701/19 |
| 2003/0051065 A1 | 3/2003 | Bao | |
| 2004/0238695 A1* | 12/2004 | Horst | B61L 3/127 246/187 A |
| 2005/0021296 A1 | 1/2005 | Aritsuka et al. | |
| 2005/0125113 A1 | 6/2005 | Wheeler et al. | |
| 2005/0205720 A1 | 9/2005 | Peltz et al. | |
| 2006/0015223 A1* | 1/2006 | LeBlanc | B61L 3/127 701/19 |
| 2007/0015485 A1* | 1/2007 | DeBiasio | H04B 1/082 455/345 |
| 2007/0192668 A1* | 8/2007 | Hrebek | H04L 69/324 714/781 |
| 2007/0210916 A1 | 9/2007 | Ogushi | |
| 2008/0136605 A1* | 6/2008 | Hunt | G06K 17/0022 340/286.02 |
| 2009/0173839 A1 | 7/2009 | Groeneweg et al. | |
| 2013/0006443 A1* | 1/2013 | Woo | B61L 15/0027 701/2 |
| 2013/0297163 A1 | 11/2013 | Kull | |
| 2014/0157610 A1* | 6/2014 | Garvey | G05B 19/401 33/503 |
| 2014/0225724 A1 | 8/2014 | Rankin | |
| 2016/0016596 A1 | 1/2016 | Naylor | |
| 2016/0176424 A1* | 6/2016 | Kupiec | G05D 1/0011 701/2 |
| 2016/0272228 A1 | 9/2016 | LeFebvre | |
| 2016/0304105 A1* | 10/2016 | Seaton | B61L 27/0038 |
| 2016/0304106 A1* | 10/2016 | Seaton | B61L 27/0038 |
| 2016/0304107 A1* | 10/2016 | Seaton | B61L 15/0027 |
| 2016/0318530 A1* | 11/2016 | Johnson | B61L 23/04 |
| 2017/0366625 A1 | 12/2017 | Lau | |
| 2018/0232959 A1* | 8/2018 | Thornburg | H04L 12/4625 |

OTHER PUBLICATIONS

Supplementary European Search Report for Application No. EP16818705.2 filed Jun. 22, 2018 which claims priority to the same parent application as the instant application, dated May 14, 2018, 4 pages.

Chinese office action for Chinese application No. 201680047314.4 which claims priority to the to the same parent application as the instant application; dated Sep. 18, 2019, 6 pages.

* cited by examiner

MONITORING AND CONTROLLING OF DISTRIBUTED MACHINES

CROSS-REFERENCE TO RELATED APPLICATIONS

This application is a continuation of U.S. Non-Provisional application Ser. No. 15/197,276 filed Jun. 29, 2016 (published as US2017/0001653 on Jan. 5, 2017 and issuing as U.S. Pat. No. 10,516,737 on Dec. 24, 2019), which, in turn, claimed the benefit of and priority to U.S. Provisional Application No. 62/187,007 filed Jun. 30, 2015. The entire disclosures of the above applications are incorporated herein by reference.

FIELD

The present disclosure generally relates to monitoring and controlling of distributed machines.

BACKGROUND

This section provides background information related to the present disclosure which is not necessarily prior art.

Rail yard operations typically involve moving large numbers of locomotives and rail cars. It can be challenging to coordinate efficient and safe movement of cars and effectively control switching operations in what at times can be a harsh environment for rail yard operators.

DRAWINGS

The drawings described herein are for illustrative purposes only of selected embodiments and not all possible implementations, and are not intended to limit the scope of the present disclosure.

FIGS. 8 and 9 are screenshots of various reports and displays made available by a user web application according to exemplary embodiments.

DETAILED DESCRIPTION

Example embodiments will now be described more fully with reference to the accompanying drawings.

The inventors have recognized that railyard operators seek rapid and efficient delivery of comprehensive status reports, alerts, and other information regarding events that affect rail cars and railyard operations, so that the operators might respond quickly and effectively to railyard conditions. Accordingly, in various embodiments of the present disclosure, a communications and control network is provided for managing actions performable by a plurality of distributed machines, e.g., remotely controlled locomotives (RCLs) moving in a rail yard, etc. In one example embodiment, a network includes a plurality of machines each having one or more sensors and/or one or more actuators. Each machine has a node resident on the machine and/or in communication with the machine. Each node has a network interface and is configured to provide raw data from the sensor(s) and/or actuator(s). Each node has a processor and memory configured as a node agent to embed the raw data in one or more messages without reformatting the raw data. An engine is configured to receive and reformat messages from the node agents without reformatting raw data embedded in the messages, and to direct the reformatted messages, including the raw data, to one or more user devices for use in managing machine activity and/or status. In some embodiments, a data handler that is in communication with the engine is configured to process the raw data into one or more formats interpretable by one or more user applications on the user devices to which the messages are directed by the engine. The data handler may push the processed data to the user application(s).

Unless indicated otherwise herein, the terms "machine" is used to refer to a mechanical and/or electrical contrivance for a particular purpose. In various embodiments, a "machine" provides functionality that may or may not be supported by a general-purpose computer. Further, unless indicated otherwise herein, "machine" refers to a contrivance that might include a general-purpose computer without itself being a general-purpose computer.

Figure 1:
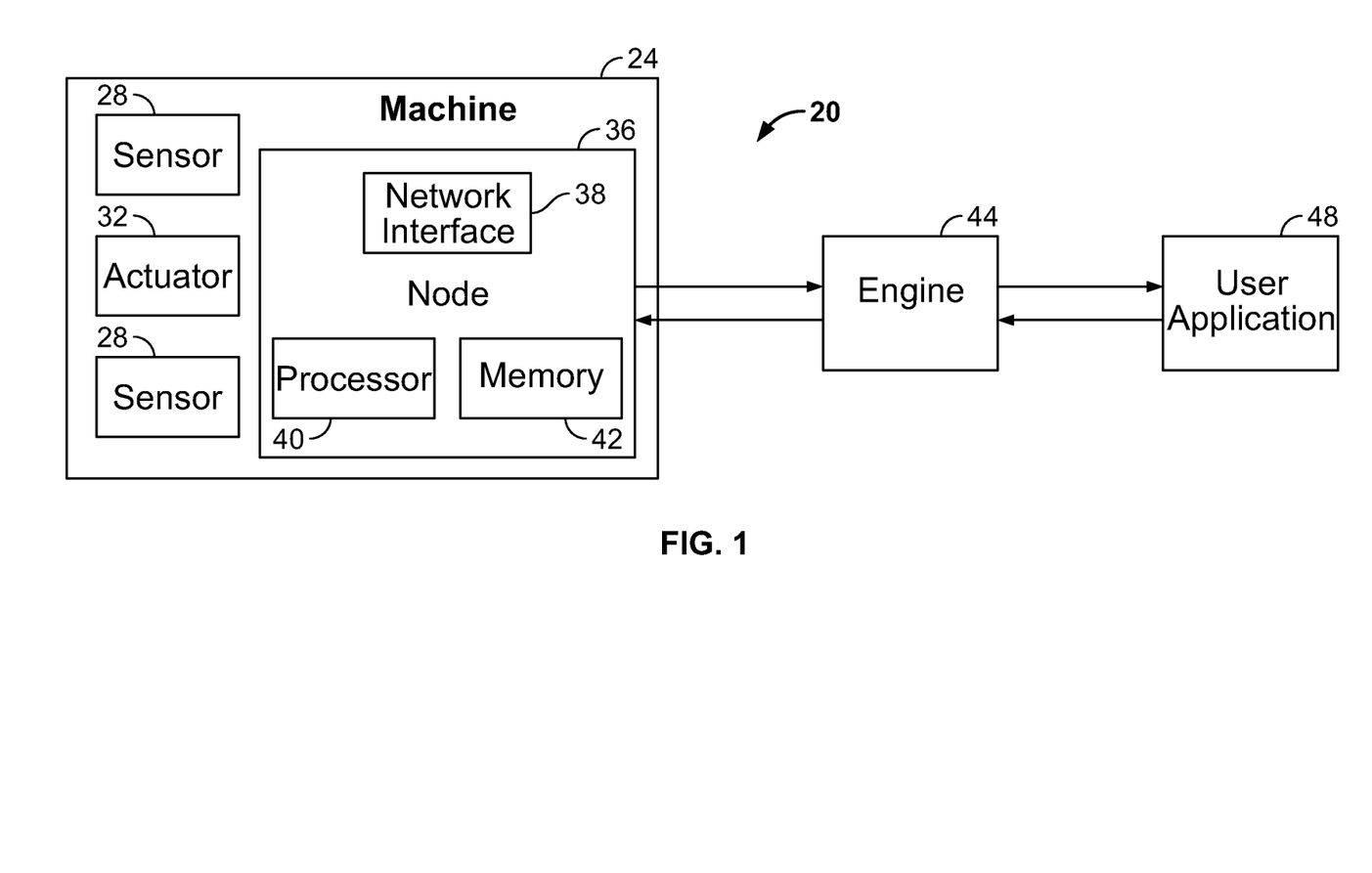
FIGS. 1 through 7 are diagrams of various communications and control network components according to exemplary embodiments.

With reference to the figures, FIG. 1 illustrates an example embodiment of a communications and control network 20 for managing actions performable by a plurality of distributed machines 24, one of which is shown in FIG. 1. The example machine 24 is a remotely controllable locomotive and generally includes one or more sensors 28, e.g., speed sensors, brake sensors, GPS receivers, etc. A machine 24 may additionally or alternatively include one or more remotely controllable actuators 32, e.g., throttles, brakes, direction control (e.g., reverse in example locomotive embodiments, etc.) etc. The sensors 28 and/or actuators 32 are configured to provide data to and/or receive data from a communication node 36 of the machine 24. The node 36 includes a network interface 38 and a processor 40 coupled with memory 42. The network interface 38 is coupled to the processor 40 (and, in various embodiments, to the memory 42 as well). The network interface 38 may include, without limitation, a wired network adapter, a wireless network adapter, a mobile telecommunications adapter, and/or other device(s) capable of communicating with one or more various networks.

The processor 40 may include, without limitation, one or more processing units (e.g., in a multi-core configuration, etc.), including a central processing unit (CPU), a microcontroller, a reduced instruction set computer (RISC) processor, an application-specific integrated circuit (ASIC), a programmable logic circuit (PLC), a gate array, and/or any other circuit or processor capable of the operations and functions described herein. The above examples are exemplary only, and are not intended to limit in any way the definition and/or meaning of processor.

The processor 40 and memory 42 are example devices that enable information, such as executable instructions and/or other data, to be stored and retrieved. The memory 42 may include one or more computer-readable media, such as, without limitation, dynamic random access memory (DRAM), static random access memory (SRAM), read only memory (ROM), erasable programmable read only memory (EPROM), solid state devices, flash drives, CD-ROMs, thumb drives, tapes, flash drives, hard disks, and/or any other type of volatile or nonvolatile physical or tangible computer-readable medium.

Furthermore, in various embodiments, computer-executable instructions may be stored in the memory 42 for execution by the processor 40 to cause the processor 40 to perform one or more of the functions described herein, such that the memory 42 is a physical, tangible, and non-transitory computer-readable medium. It should be appreciated that the memory 42 may include a variety of different memories, each implemented in one or more of the functions or processes described herein.

In various embodiments and as further described below, the processor 40 and memory 42 of the node 36 are configured to perform as a software agent of the node 36, e.g., to send (e.g., push, etc.) raw data from sensor(s) 28, actuator(s) 32, and/or other data sources to an engine 44 of the network 20. Unless otherwise indicated, the term "raw data" refers to primary source data in its original digital form, including (a) data originally produced in digital form and (b) data converted, e.g., via an analog-to-digital converter, from its original analog form to its original digital form.

In some embodiments, the engine 44 may be or reside on a server remote from the machines 24. In the example network 20, the example engine 44 is a standalone application that manages remote communication between the nodes 36 and one or more user software applications 48. The user application(s) 48 may be web-based, although other or additional networks may be used. In embodiments for use in rail yard environments, users of user applications 48 may include, e.g., rail yard operators monitoring and/or controlling locomotive movement and conditions. The engine 44 may send at least some of the raw sensor and/or actuator data from the node 36 to the user application(s) 48. In some embodiments, user(s) may use the application(s) 48 to send data, e.g., sensor configuration data, commands, etc., to the node(s) 36 via the engine 44 and node agent(s) for the node(s) 36.

FIGS. 2 through 7 illustrate various components of an example communications and control network 100 for monitoring and controlling a plurality of remote control locomotives (RCLs), e.g., in a rail yard environment. It should be appreciated that exemplary network embodiments may include the same or different components arranged otherwise, for example, depending on interactions and/or relationships between various components in the exemplary embodiments, etc. The network 100 may include, without limitation, a wired and/or wireless network, a local area network (LAN), a wide area network (WAN) (e.g., the Internet, etc.), a mobile network, a virtual network, other or additional suitable public or private network(s) capable of supporting communication among two or more of the illustrated components of the system 100, combination(s) thereof, etc. In one example, the network 100 includes multiple networks, where different ones of the multiple networks are accessible to different ones of the illustrated components in FIGS. 2 through 7.

Figure 2:
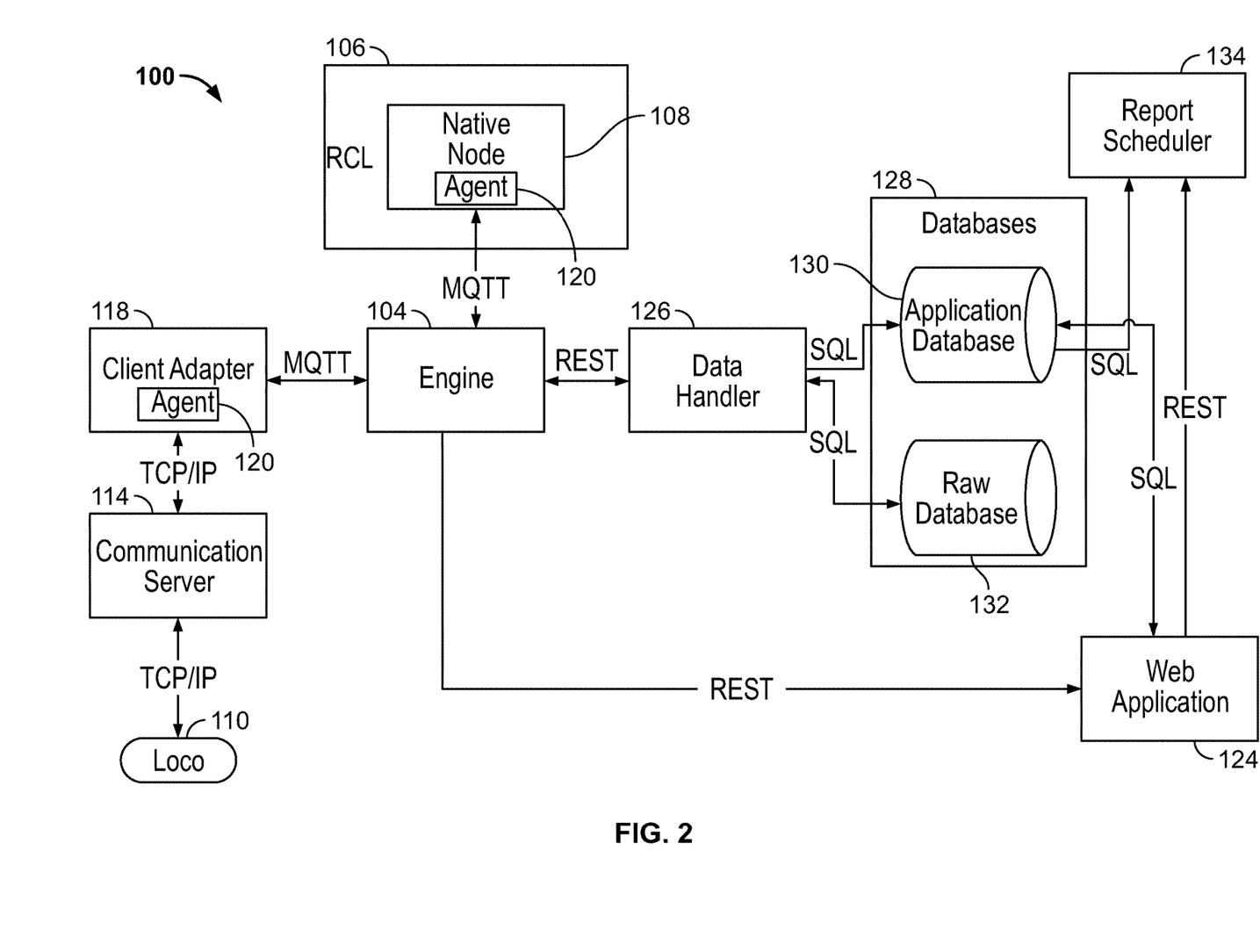
Figure 3:
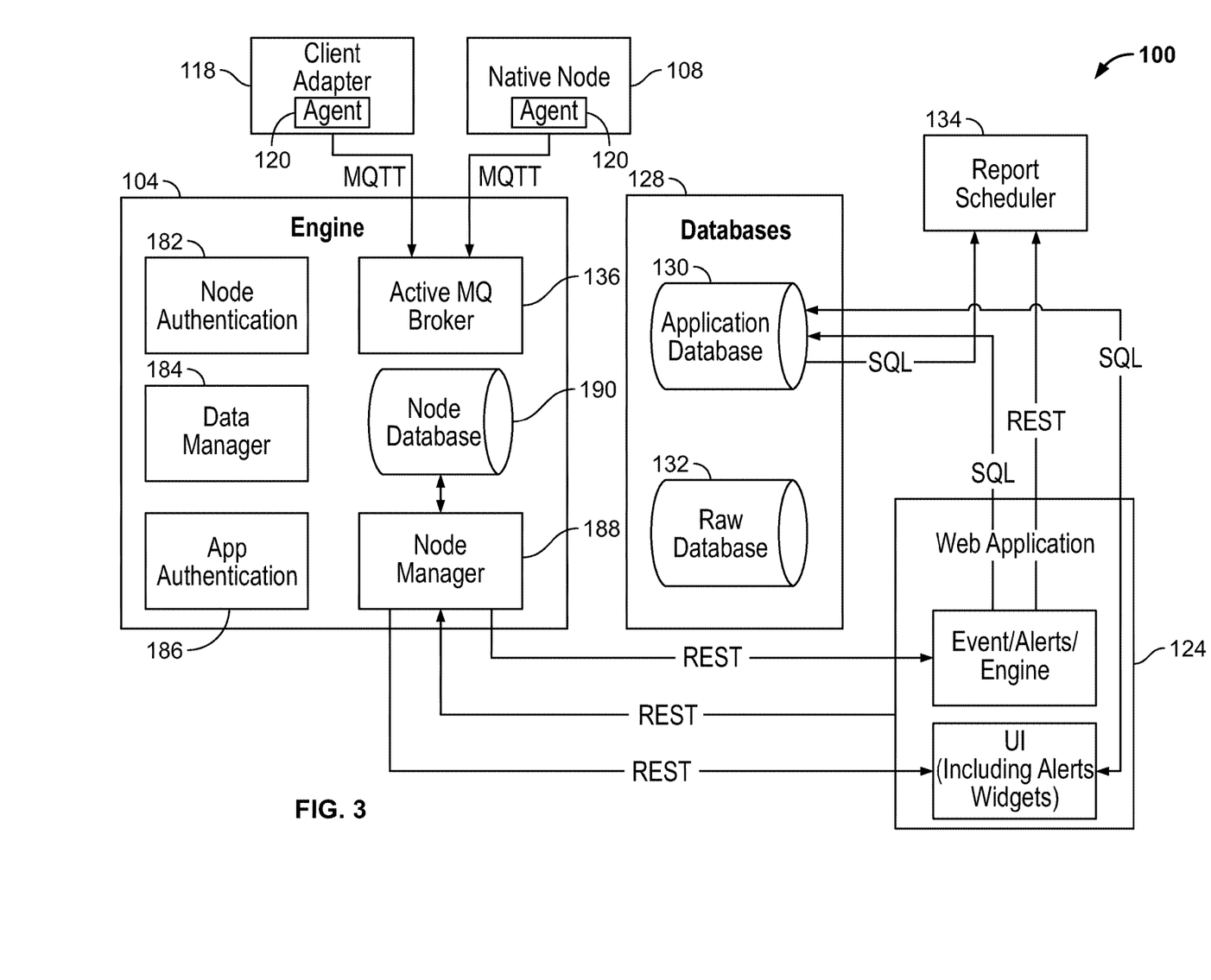
Figure 4:
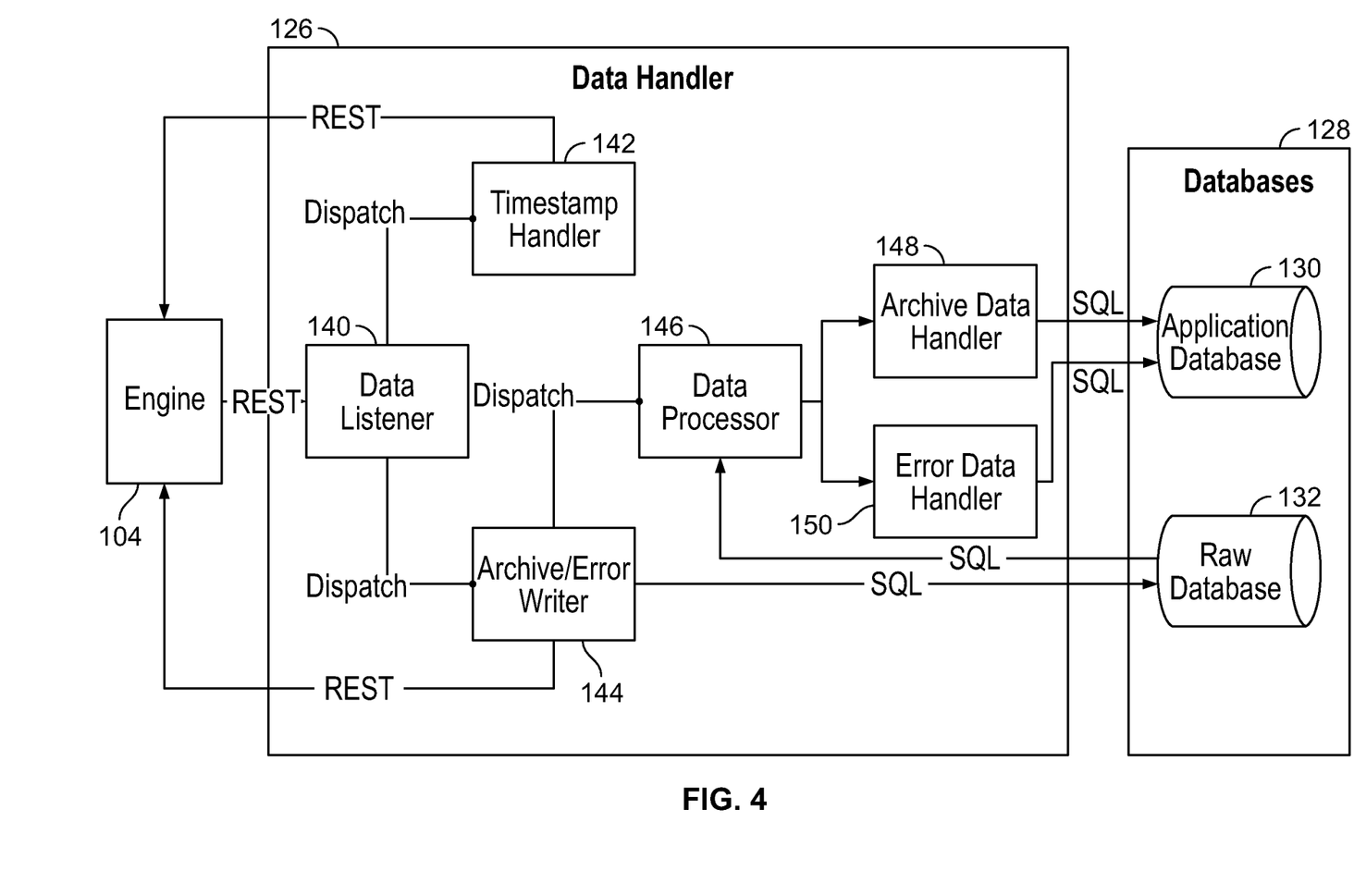

As shown in FIGS. 2-4, the example network 100 includes an engine 104, e.g., that is and/or resides on a server. The engine 104 is in communication with a plurality of "native" nodes 108, one of which is shown in FIGS. 2 and 3. In this example, a native node 108 is one that is provided on a "native" RCL 106 (shown in FIG. 2) and that is configured to perform rail yard communications through the engine 104. In such manner, and in various embodiments, various actions and/or status of the RCL 106 may be substantially continuously monitored and/or controlled through the engine 104 and node 108, via a centralized server, over one or more communications networks.

Figure 6:
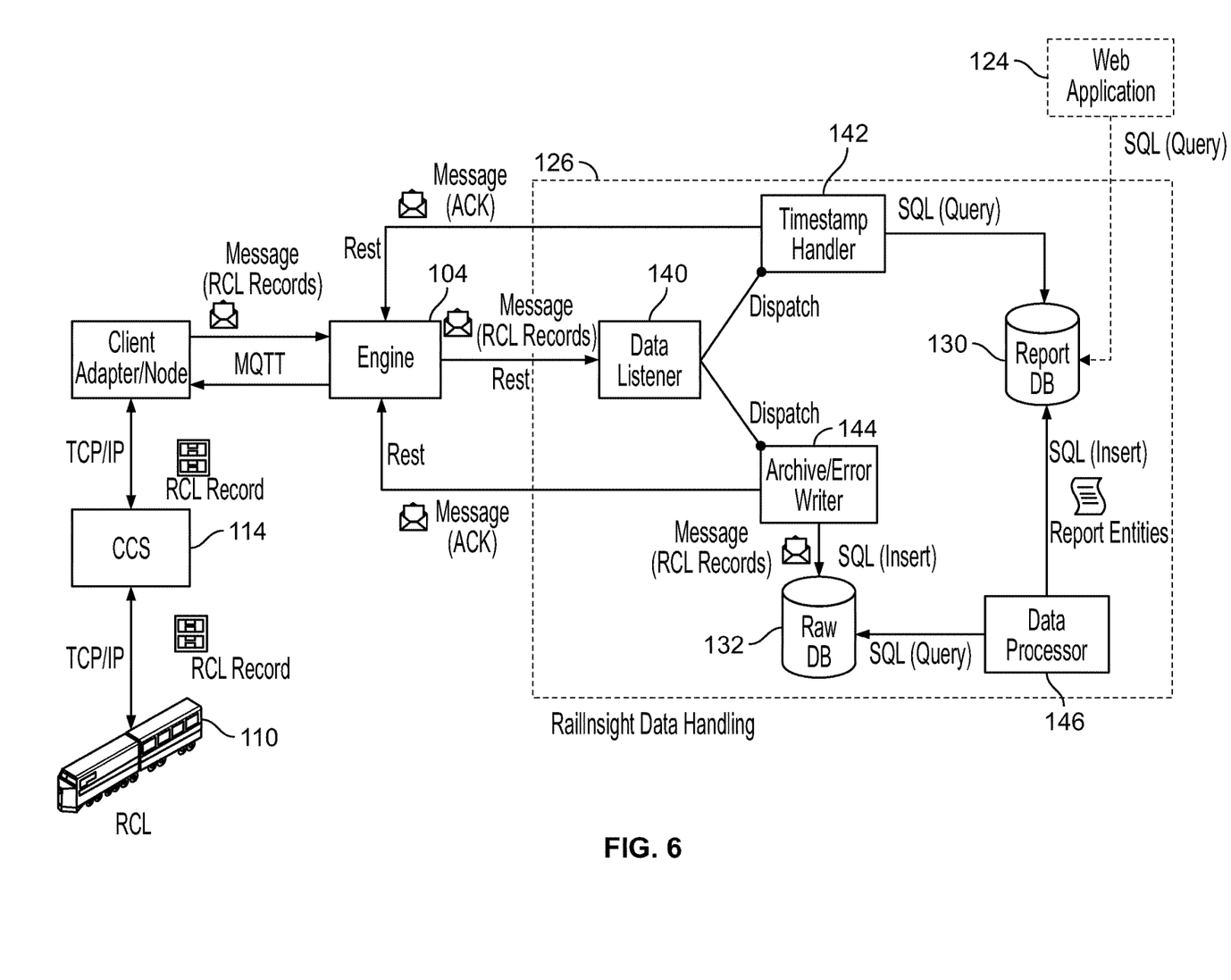

Additionally or alternatively, a node may be provided, e.g., simulated, that is remote from an RCL. For example, some "non-native" RCLs may have control systems that are not automatically compatible with the network 100. In the present example embodiment and as shown in FIGS. 2 and 6, a "non-native" locomotive 110 is configured to perform rail yard communications through a communication server 114 that is not configured for communication with the engine 104. Accordingly, in the present example embodiment, a client adapter 118 is provided for the "non-native" locomotive 110. In the present example embodiment, a client adapter 118 is provided for each of a plurality of organizations operating non-native locomotives, and each client adapter 118 includes a plurality of agents 120, one agent 120 per locomotive. In various embodiments, various numbers of client adapters and/or agents could be provided and/or distributed among non-native locomotives.

In various embodiments, the client adapter 118 simulates a "native" node 108, e.g., by adapting communication between the non-native locomotive 110 and the communications server 114 to provide communication between the non-native locomotive 110 and the engine 104. In such manner, and in various embodiments, various actions and/or status of the non-native locomotive 110 may be substantially continuously monitored and/or controlled through the engine 104 and a simulated node via a centralized server, over one or more communications networks.

Each node 108 and client adapter 118 includes a software agent 120 configured to communicate with the engine 104. In the present example embodiment, nodes 108 and/or client adapters 118 may provide raw data from various data sources, e.g., RCL speed sensors, brake sensors, etc. In various implementations and as further described below, the node agents 120 send (e.g., push, etc.) the raw data provided by the nodes 108 and/or client adapters 118 to the engine 104. The engine 104 sends (e.g., pushes, etc.) at least some of the raw data to one or more user applications. In various embodiments, including the example network 100, the user application(s) include a web application 124, e.g., whereby a railcar operator may monitor rail yard events and conditions at a plurality of rail yards.

A data handler 126 also may receive raw data pushed by the agents 120 and the engine 104. As further described below, the data handler 126 may interpret the raw data and format it in ways that are meaningful to recipient(s) of the data, e.g., one or more user applications including the web application 124. The data handler 126 has access to databases 128, including an application database 130 and a raw database 132. The application database 130 (also sometimes referred to herein as the "report database 130") is used, e.g., for making various reports available through the web application 124. A report scheduler 134 has access to the application database 130.

As shown in FIG. 3, the engine 104 includes a broker 136 configured for communication with the agents 120. In the present example embodiment, raw data provided by a node 108 is embedded by the agent 120 for the node 108 in a message. It should be noted that an agent 120 embeds raw data in its original digital form in a message, i.e., without reformatting the raw data. The agent 120 sends, (e.g., pushes, etc.) the message to the engine 104. In some embodiments, messages communicated between the agents 120 and broker 136 are in accordance with one of several possible message communication protocols, e.g., MQTT (Message Queuing Telemetry Transport,) WebSockets, or other method that allows the sending of a structured message of bytes from one node to at least one and possibly more than one node.

In one example embodiment in which MQTT is used as the underlying message transport protocol, the agents 120 are subscribed as clients in a publish/subscribe ("pub/sub") messaging system managed by the broker 136. The broker 136 receives messages from various software clients in the network 100 that publish messages to various topics. The broker 136 forwards a given published message to those clients subscribed to the topic to which the message is addressed. Other components in the example network 100, besides the agents 120, may be subscribed as clients to send and/or receive messages through the broker 136. In the present example embodiment, various user application(s), e.g., the web application 124, report generating applications, event and/or alert tracking applications, etc., may subscribe and/or publish as client(s) to various topics managed by the broker 136.

In various embodiments, subscriber topics and subtopics are used to separate different types of message traffic into different traffic channels. For example, in the network 100, a MQTT topic schema (e.g., topic/subtopic/subtopic) is used for managing delivery of, and response to, messages. "Namespace" subtopics are used to direct communications between node agents 120 and the engine 104. Predefined namespaces are used to separate different types of message traffic, although embodiments also are possible in which topics and/or subtopics may be dynamically defined. In one example embodiment, a traffic channel for a given message may be indicated in the following way:

<Root>/<Org>/<Namespace>/<Route>/<NodeID>/<MethodName>/ . . .

where "Root" indicates a protocol version, "Org" indicates an organization, e.g., a rail operator company that is receiving or sending the message, "Namespace" indicates the message type, also referred to herein as message channel, "Route" indicates, e.g., whether the message is from a node agent 120 to the engine 104 or vice versa, "NodeID" identifies a node sending or receiving the message, and one or more "MethodName" subtopics indicates one or more functions relating to use(s) for a data payload included in the message. Unique <Route> subtopic pairs are used, e.g., by a remote node 108 and the engine 104, e.g., for discovery request and for discovery response messages, thereby allowing the remote node 108 and engine 104 to subscribe to a unique topic to avoid receiving an "echo" of the message.

In some embodiments, the agents 120 are implemented as WebSocket clients attached to a WebSocket server embedded in the engine 104. Messages are sent as point-to-point communication between the agents and engine, beginning with a binary header with a common format that defines, among other information, an "Organization" such as the rail operator representing the locomotive, a "Namespace" indicating the message type or channel, and a "MethodName" containing one or more functions relating to use of the payload contained in the remainder of the binary message. In various embodiments in which WebSocket protocol is used, the engine 104 is capable of tracking nodes 108 and pushing data back and forth between nodes 108. In such embodiments, the engine may register information for every node 108. In some embodiments, the user application 124 registers with the engine 104 and requests raw data from a given node 108. The given node 108 sends the data in a message to the engine 104, which sends the data, via a RESTful call, to the application 124. In such embodiments, the application 124 is capable of decoding the raw data, received in real time by the user application 124, for display and/or other uses.

In the present example embodiment, the "Namespace" subtopic in a given message operates to direct that message into one of three channels: a "status" channel, a "data" channel, or an "alert" channel. (A "control" channel may also be provided in various embodiments and reserved for network control functions.) The "status" channel may be used for sending real-time status information, e.g., from a node 108 to user application(s) such as the web application 124. Status information may be in the form of raw data for inclusion in a "snapshot," i.e., a current archive record that may be used to periodically update a real-time view provided in the web application 124 or other user application. View data may include, e.g., connection status of a given RCL in the network 100, location of a given RCL on a map based on current GPS coordinates of the RCL, RCL velocity, velocity set point, direction, automatic brake pressure, independent brake pressure, throttle output, etc. Additionally or alternatively, data sent via the "status" channel for a given RCL may be used, e.g., by the web application 124 in a "locomotive virtual dashboard" ("LVD") display that includes current operating information for the given RCL. LVD display information may include, e.g., the RCL's current velocity, velocity set point, direction (reverser output), automatic brake pressure output, independent brake pressure output, throttle output, and configuration mode (changeover switch status), etc.

Figure 5:
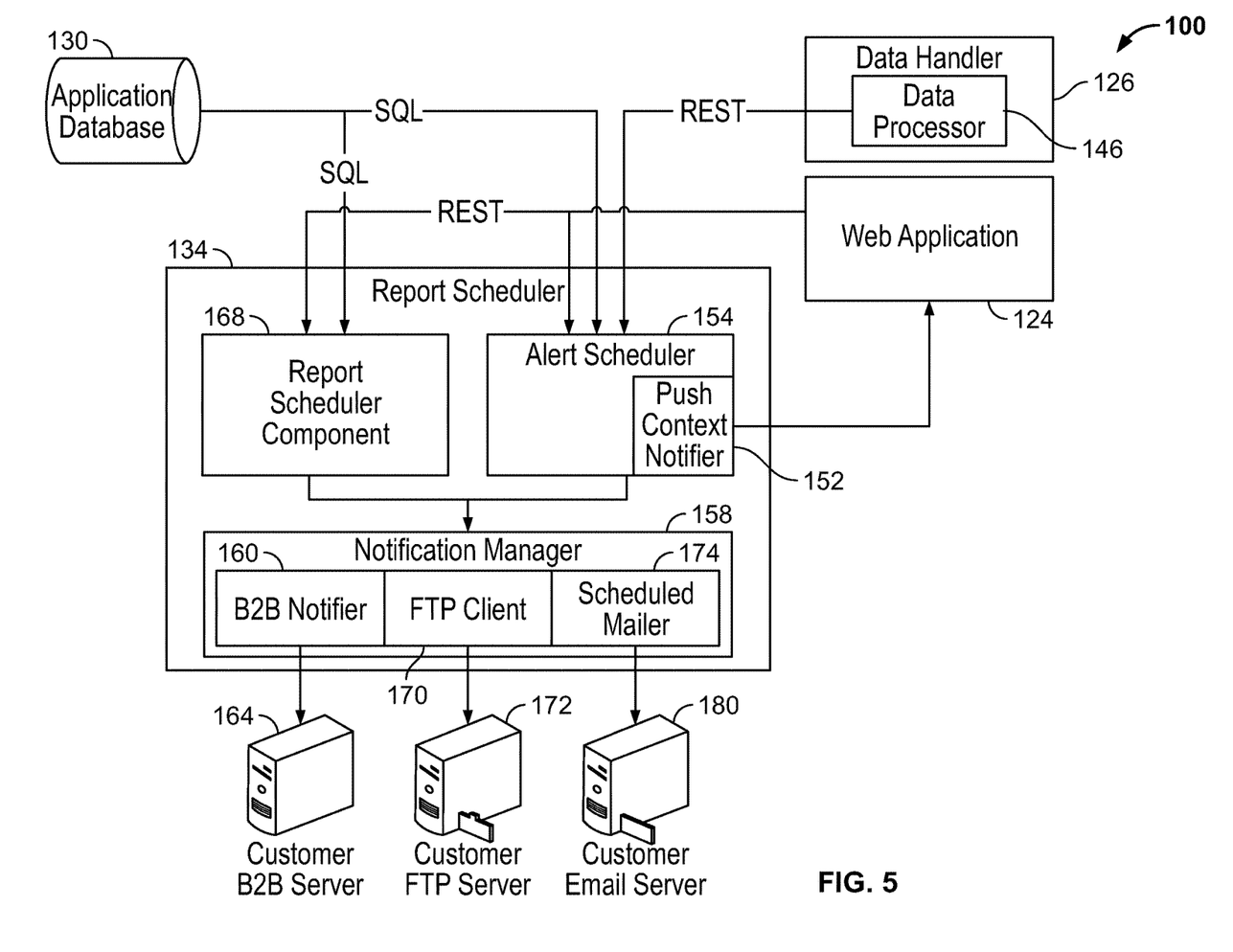

The "data" channel may be used, e.g., to transport and persist individual RCL event archive records, e.g., from all RCLs to the application database 130. The application database 130 provides data for various reports made available, e.g., by the user web application 124. The "data" channel is used, e.g., to direct data flow so that archive records of data from locomotives might be parsed and stored in a unified format that allows for reporting in a unified relational schema. The data may also be stored in a schemaless fashion. Referring to FIGS. 4 and 5 and as discussed below, a data processor 146 of the data handler 126 may extract messages from the raw data database 132 and may decode the raw data for use by user applications such as the web application 124. The data processor 146 performs decoding of data from the raw database 132 when directed by the archive/error writer 144 that new raw data records have been added. The data processor 146 also sends alert data to the application database 130 when it sends alert data to an alert scheduler 154.

The "alert" channel is used to send real-time information from a node 108 to the engine 104 that may be used to generate system alerts, which in the present example embodiment are indications of conditions that require attention by an operator. For example, upon detecting that an RCL has a binary configuration file (BCF) configuration that has changed, a node 108 may send a "BCF changed" alert message, via the engine 104, that is pushed to the user web application 124. As another example, upon detecting a meaningful change (e.g., of about 0.25 miles) in an RCL's GPS position, a node 108 of the RCL may send a "GPS movement" alert to the user web application 124. Notably, the "alert" channel may be used, e.g., to push alerts to user application(s) such as the web application 124 and thereby provide real-time notification of the alerts to the application(s). In various embodiments, the data processor 146 processes alert data, e.g., to conditionally generate data in a database table of alerts associated with, e.g., a particular railyard operator. The table may be distributed, e.g., to the operator's employees via email and/or application user interface.

In various embodiments, the broker 136 reformats messages received from agents 120, but does not reformat the raw data in the messages. In some embodiments, the broker 136 reformats a given message from an agent 120 by embedding the raw data, e.g., in a message in conformity with a software architectural style that preserves the binary form of the raw data. In various embodiments, the broker 136 includes a rule-based routing engine whereby the format of a message may be changed prior to routing of the message to a client subscriber. In the example network 100, the broker 136 includes an Apache ActiveMQ broker with embedded Apache Camel. The broker 136 automatically converts an incoming MQTT message from an agent 120 into an outgoing message in accordance with, e.g., the Representational State Transfer (REST) style. The broker 136 forwards the reformatted messages to appropriate clients of the pub/sub messaging system. In various embodiments, appropriate clients may be identified, e.g., as shown in Table 1. The root of all REST URIs (Uniform Resource Identifiers) for RESTful calls is /orgs/.

TABLE 1

| URI | RESOURCE |
| --- | --- |
| /orgs/<organizationID> | Organization-level data |
| /orgs/<organization>/nodes/<nodeID> | A node of an organization |
| /orgs/<organization>/listeners/<listenerID> | A listener of an organization |
| /orgs/<organization>/groups | All groups of an organization |

In various embodiments, data is pushed, e.g., from a node 108 to the user web application 124 via the engine 104, and the application 124 passively receives the data. It should be noted that in various embodiments, an application or other client that is configured to receive raw data payloads in messages from the engine 104 has also been configured to interpret and/or make appropriate use of such raw data. In other embodiments, and as further described below, raw data may be processed before being pushed to an application that expects data to have units or other additional meaning. In various embodiments, an event/error record is requested by the client adapter 118 using a proprietary binary protocol. This event/error is then sent from the locomotive to the client adapter 118 using the same proprietary binary protocol. The client adapter 118 then inspects this record and has the ability to publish immediate alerts or the entire binary content, e.g., via MQTT, to the engine 104. The engine 104 may package this and publish this to either the data handler or the user application via REST. In various embodiments, WebSockets may be used in addition to or in place of MQTT.

In various embodiments, a node 108 and/or node agent 120 may include one or more client application programming interfaces (APIs) to support various types of connectivity and functionality. In the example network 100, nodes 108 can be running different types of client APIs. The broker 136, and/or in some embodiments, a server, e.g., of the engine 104, supports a plurality of messaging protocols, e.g., MQTT, AMQP (Advanced Message Queuing Protocol), STOMP (Streaming Text Orientated Messaging Protocol), etc., and translates between them internally. In some example embodiments, a Raw MQTT API is provided on a node 108, e.g., to allow RCL sensors and/or actuators, which may be low functioning embedded devices that have only lower protocol elements, to communicate as and/or through nodes 108, and through the engine 104. In some embodiments, a WebSocket client API may be provided that enables a node 108 to exchange messages with the engine 104. Other example APIs include node C and/or C++ API(s) that expose functionality on a node 108 to allow C and/or C++ program code, e.g., in various user applications, such as the web application 124, to connect to the engine 104 and manipulate objects on the node 108, e.g., to connect, authenticate, create objects, change properties, fire events, expose remote service routines, etc. A node Java API allows an embedded client to connect to the engine 104 and to directly expose Java class object instances as objects. Similarly, on the engine 104, a Java Application API allows the engine 104 to manipulate remote network objects directly as Java objects running on the server JRE (Java Runtime Environment). An application Java API allows an enterprise Java application to connect to the engine 104, and to communicate with the nodes 108 and data using a direct Java object encoding.

Other or additional example client and/or server API embodiments may be provided to support various standard programming languages, styles, etc., so that, e.g., capabilities may be written to provide for interaction between and/or among the engine 104, the broker 136 and clients of the broker 136. In one example embodiment, a REST API available on the engine 104 allows user applications, such as the web application 124, to communicate with the engine 104 and remote nodes 108, using an HTTP REST interface.

The structure of the example network 100 may be generally described in terms of protocol layers. For example, a physical layer (PHY) provides physical network connections (e.g., LAN, WLAN, and/or cellular network connections). At a link layer, link-level encryption (e.g., SSL/TLS) may be provided, e.g., between a node 108 and the engine 104. A WebSocket layer may provide an HTTP tunnel capability between an embedded client and the engine 104. Additionally or alternatively, clients may communicate directly via TCP. In various embodiments, MQTT may be used as a fundamental communication protocol for much, if not all, network functionality between nodes 108 and the engine 104. MQTT provides pub/sub functionality, which, in some embodiments, is provided along with direct broker-to-broker communication. Direct broker-to-broker communication may be used, e.g., where multiple engines are being used and messages are to be published to all subscribers regardless of which broker a subscriber is connected to. It should be understood, however, that the use of brokers is not limited to use in accordance with MQTT protocol. Generic brokers and/or other types of brokers could be used in various embodiments.

In various embodiments, a MQTT topic schema defines a topic layout for network functionality (e.g., discovery, authentication, property publishing, remote service invocation, etc.) A data schema defines how an object schema will be transmitted over the MQTT topics. Thus, both "generic" (structural) schema and "instance" (specific object data) may be allowed to be communicated between an embedded client and the engine 104. In various embodiments, MQTT message payloads are binary (arbitrary byte arrays). The following example data elements may be defined as contents of a message: version, timestamp, message sequence number, correlation identification, reply topic, data encoding (e.g., "0" for binary data, "1" for text/string data), and data (e.g., a variable byte array, which can be empty). Through use of the topic schema and data schema, an embedded device having only protocol elements that are, e.g., below the MQTT layer, is allowed to operate as and/or through a node 108.

It should be understood generally that embodiments are possible in which a node may have more than one agent, and/or an agent may represent more than one node. Further, a node may vary in various embodiments. For example, in various embodiments a node could represent, e.g., a sensor, actuator, or other device, a RCL or other machine, a sub-system of a machine, a hardware, firmware and/or software component, etc. In some embodiments, messages to and/or from the engine 104 could be formatted in accordance with other or additional protocols and/or styles, so long as raw data from the agents 120 remains unformatted in the messages.

As shown in FIG. 4, the data handler 126 includes one or more data listeners 140 to detect message events, which are dispatched, e.g., to a timestamp handler 142 and an archive/error writer 144. The archive/error writer 144 writes raw data to the raw database 132. In various embodiments, the archive/error writer 144 dispatches message events to the data processor 146. For example, the data processor 146 is called asynchronously by the archive/error writer 144 when a message event is inserted into the raw database 132. In various embodiments, more than one data processor 146 at a time may be running.

In some embodiments, when called by the archive/error writer 144, the data processor 146 pulls raw data from the raw database 132 and interprets the raw data. In one example embodiment, when the data processor 146 extracts message data from the raw data database, it may parse and decode the raw fields into an archive entry. It should be noted that the decoded data is meaningful, e.g., has been assigned, by the data processor 146, units and/or other explanatory structure and/or information relating to the data as it is to be used, e.g., in a recipient user application such as the web application 124. The data processor 146 may process the raw data based on, e.g., a "MethodName" subtopic specified in the message from the engine 104 and specific to the user application that is to receive the decoded data. The data processor 146 calls an appropriate handler for the decoded data, e.g., an archive data handler 148 if the data was successfully processed, or, e.g., an error data handler 150 if the data was not successfully processed.

Referring now to FIG. 6, the data processor 146 may extract multiple RCL records from a given message from the raw database 132, and may decompress each RCL record into an uncompressed record. The data processor 146 parses each uncompressed record into multiple raw data fields and decodes the raw data fields into, e.g., a single archive entry in which the decoded data is meaningful. The data processor 146 may compute a unique record timestamp from report entities (i.e., data structures such as rows, columns, etc. representing data in the application database 130) and may persist the archive entry to the application database 130.

In various embodiments, the data processor 146 also queries the raw database 132 for records to process. Records may be updated regularly, e.g., hourly. The data processor 146 may process a record by calling the appropriate handler (e.g., archive data handler 148 or error data handler 150) based on the function in the message. If processing is successful, the data processor 146 marks the original record in the raw database 132 as "Processed." Otherwise the original record is marked as "Error."

As shown in FIG. 5, the data processor 146 processes an "alert" channel message, e.g., as described above, to produce an alert. The data processor 146 pushes alerts to the alert scheduler component 154 of the report scheduler 134. A push context notifier 152 of the alert scheduler component 154 notifies, e.g., the web application 124 that a new alert has been produced, e.g., for a given company using the network 100. If a user is currently displaying a web page with a list of alerts for a given company (e.g., in various embodiments, a locomotive virtual dashboard (LVD) provides such a list) and the user web application 124 receives an alert from the push context notifier 152, the list of alerts is refreshed, e.g., from the application database 130, and the new alert is displayed. The alert scheduler component 154 thus pushes alerts to the user web application 124, and in some embodiments, to a notification manager 158. A B2B (business-to-business) notifier 160 of the notification manager 158 sends, e.g., pushes, alerts, e.g., emergency brake alerts, to a customer machine-to-machine server 164. The report scheduler 134 also includes a report scheduler component 168 that generates and sends scheduled reports through an FTP client 170 to a customer FTP (File Transfer Protocol) server 172. Email reports also may be sent, e.g., through a scheduled mailer 174 to a customer email server 180.

Figure 7:
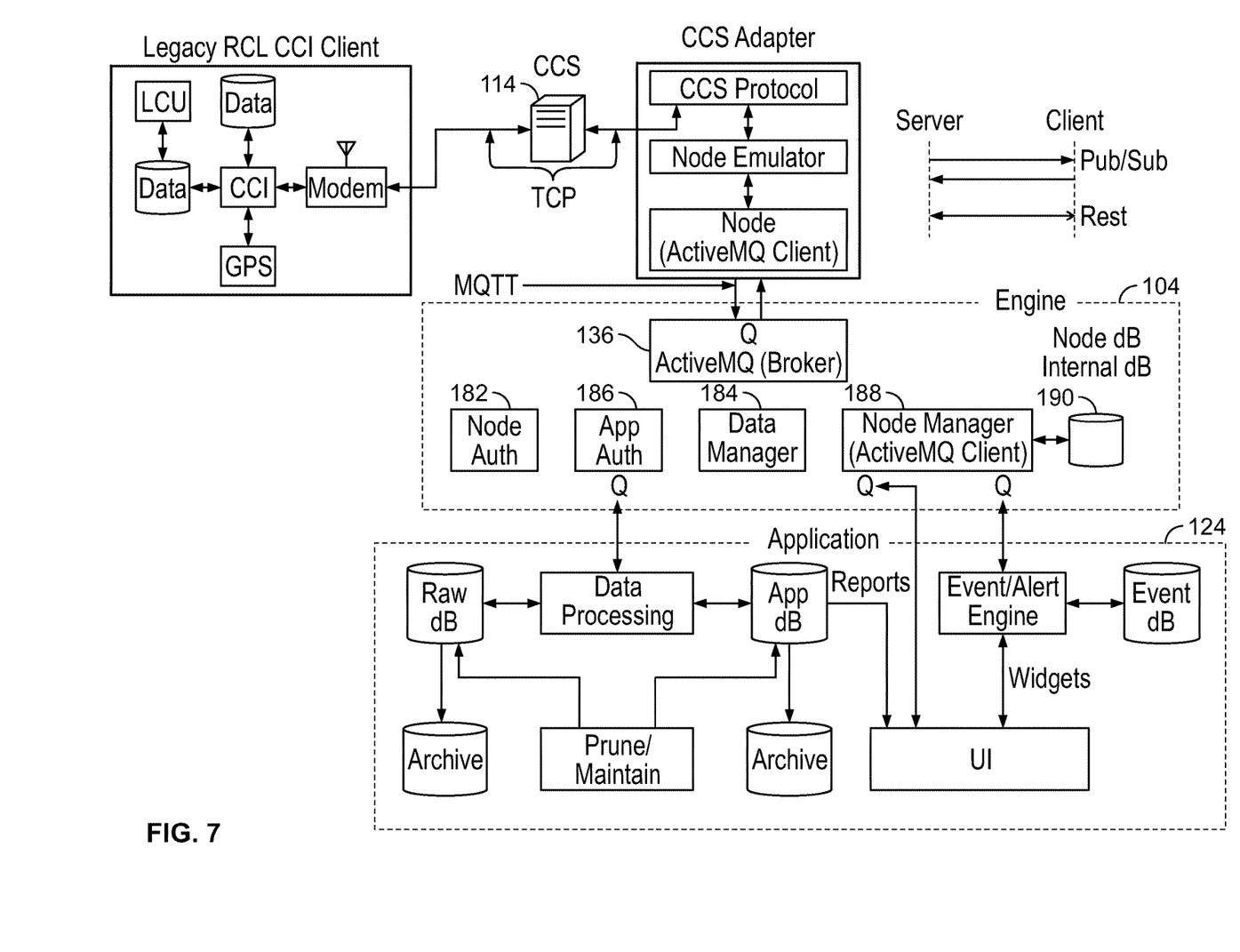

As shown in FIGS. 3 and 7, the engine 104 includes a node authentication component 182, a data manager 184, and an application authentication component 186. The application authentication component 186 monitors, e.g., whether particular subscriber clients to the pub/sub messaging system may be allowed to subscribe to various topics and perform various actions, e.g., based on user roles. A node manager 188 of the engine 104 has access to a node database 190. In some example implementations, the node manager 188 receives status information from node agents 120 via the broker 136, provides an indication to an application when new clients have authenticated via API, provides an API to the application to query for the current client status, and provides an API, e.g., to the application 124 to communicate with clients.

Various types of displays and reports may be generated based on raw data received through the engine 104 and processed by the data handler 126. In some embodiments, widgets of the user web application 124 retrieve processed data from the application database 130 for use in generating reports as requested by a user of the application 124. In various embodiments, a user may access the user web application 124 to display a home page that includes a summary of alerts and locomotive locations and status.

Figure 9:
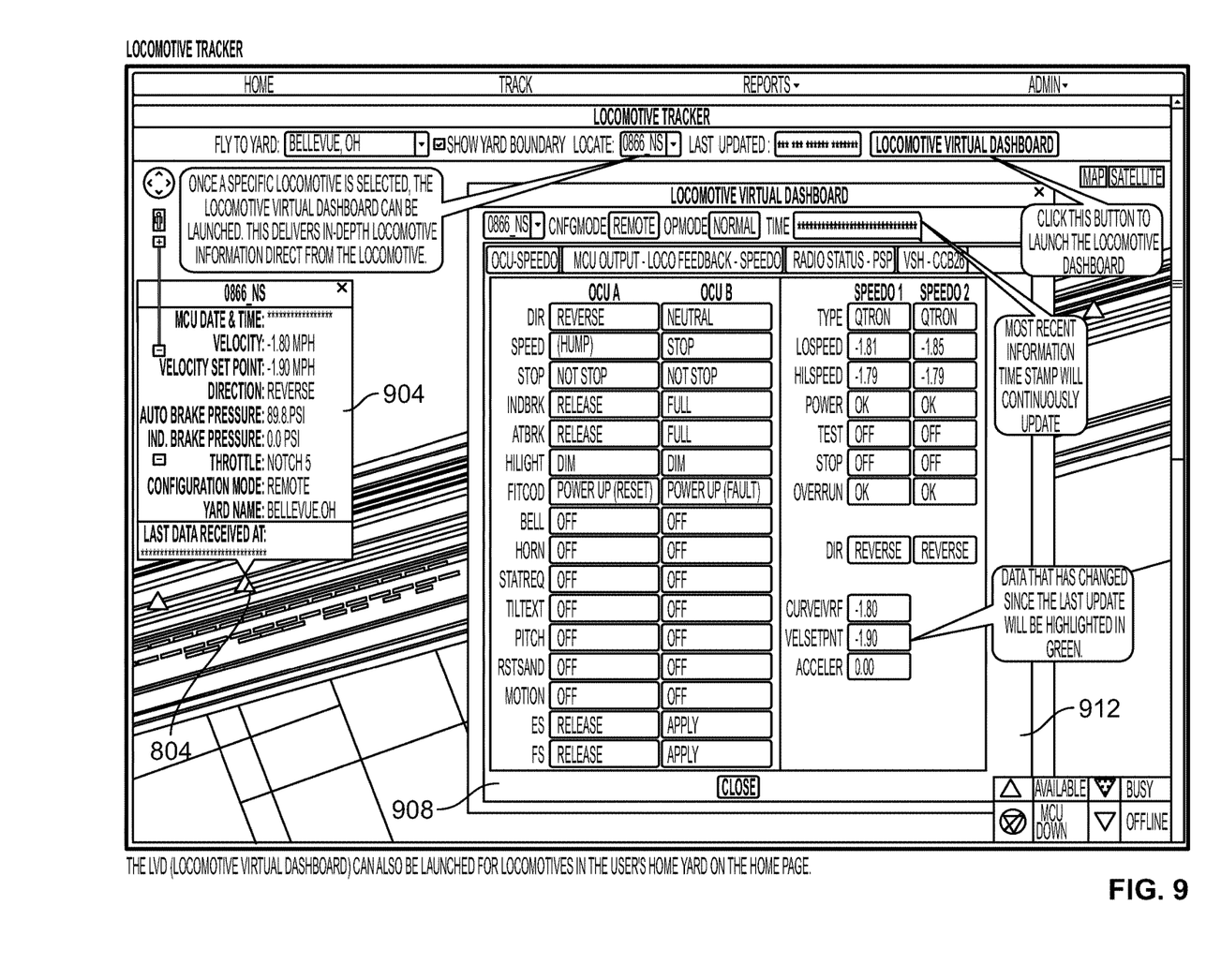

In one example embodiment and as shown in FIG. 8, a user authorized to view data for a given rail yard may display a home page 800 for that railyard. Individual RCLs in the railyard may be tracked by widgets and represented by icons 804 on a railyard map 808. Icons 804 may be color-coded to indicate RCL current connection status (e.g., available, busy, MCU down, offline, available (remote mode), busy (remote mode), etc.) As shown in FIG. 9, a user may click on a particular RCL icon to display summary information 904 about that particular RCL, including, e.g., date and time, yard name, RCL velocity, velocity set point, direction, automatic brake pressure, independent brake pressure, throttle, configuration mode, etc. When a specific RCL icon has been selected, the user may launch a locomotive virtual dashboard (LVD) 908 for that RCL. The LVD 908 delivers in-depth locomotive information 912, direct from the selected RCL. In various embodiments, data displayed in the LVD 908 may be substantially continuously updated and selectively colored or highlighted to show which data fields have changed since the last update.

Reports 812 may be displayed to provide productivity data, e.g., in summary form and/or for each RCL in the railyard. Productivity data may include, e.g., length of time in remote configuration mode, utilized time in remote configuration mode, percent of time in remote configuration mode that was utilized, distance traveled, average speed, total time moving, number of transfers of system control to rail yard automation, total humping time using rail yard automation, speed violation occurrences, speed violation duration, number of wheel slips, etc. In various implementations, the web application 124 may provide information for more than one railyard, e.g., to users who have been assigned roles permitting them to view data for a plurality of specific railyards.

Embodiments of the foregoing engines and/or networks can make it possible to effectively track, monitor and control a wide range of machine types, including but not limited to remote control locomotives, other types of remote control vehicles and devices, and various kinds of distributed machines. Raw data, from various machines that are not necessarily compatible for communication with one another, can be automatically pushed and processed for use by recipient user applications. The raw data can be processed to acquire a meaning that is useful to an individual user application, and the processed data can be pushed automatically to the application. In various embodiments, an automatic push capability can provide real-time notification of alerts to user applications.

It should be appreciated that some functions described herein, in some embodiments, may be described in computer executable instructions stored on a non-transitory computer readable storage medium, and executable by one or more processors. By way of example, and not limitation, such computer-readable media can include RAM, ROM, EEPROM, CD-ROM, optical disk storage, magnetic disk storage and/or other magnetic storage devices, and/or any other medium that can be used to carry or store desired program code in the form of instructions and/or data structures and that can be accessed by a computer. Combinations of the above should also be included within the scope of computer-readable media.

Further, various embodiments of the disclosure may be implemented at least partially using computer programming and/or engineering techniques including hardware, software, firmware or any combination or subset thereof, wherein the technical effect may be achieved by a network engine performing at least one of the following steps: receiving messages from node agents of nodes resident on and/or in communication with a plurality of machines, each node configured to provide raw data relating to one or more actions performable by an associated machine, each node configured to include a node agent for embedding raw data provided by the node in a message without reformatting the raw data; reformatting the received messages without reformatting the raw data; routing the reformatted messages to user application(s); and sending a message responsive to the raw data to a node agent of a receiving node for use in controlling performance of an action by one of the machines.

In another implementation, a method of managing a plurality of remotely controlled machines includes the following steps: embedding in a message raw data from one or more sensors and/or one or more actuators of one of the machines, the embedding performed by a node residing on and/or in communication with the one of the machines; receiving the message from the node and reformatting the message without reformatting the raw data, and directing the reformatted message including the raw data to a user device, the receiving, reformatting and directing performed by an engine of a network that includes the node and the user device; and the user device sending a message responsive to the raw data through the engine to the node for use in controlling performance of the one of the machines.

Exemplary embodiments of communications and control networks disclosed herein may be used for managing actions performable by a plurality of distributed machines, e.g., remotely controlled locomotives (RCLs) moving in a rail yard, etc. By way of example, an exemplary embodiment of communications and control network may be used with or include a home page that provides a summary of alerts, locomotive locations and status (e.g., an interactive tracking map, etc.), and report feeds, e.g., to give users a quick overview at a glance. The home page may include an alerts panel that collects all alerts that are sent to a user's email. The alerts may be marked, e.g., as read or unread to more easily track a specified time span, e.g., the last seven days of alerts. In various embodiments, a Locomotive Virtual Dashboard (LVD) may be launched for locomotives in a selected railyard. After a specific locomotive is selected, the LVD may provide in-depth locomotive information direct from the locomotive, such as velocity, velocity set point, direction, automatic brake pressure, independent brake pressure, throttle, configuration mode, and yard name. Consolidated reports may be produced by combining similar information from a plurality of reports, which can make the running of reports more efficient and can reduce the need for putting separate reports together to create a complete picture. Different user roles may be set up such that selected user roles have access to specific reports and/or displays. Assigning user roles can make a network embodiment easier to use and makes it possible to provide only the information that is useful to the particular user. Accordingly, user access to reports and/or displays can be based on the user's role in a yard. By way of example, the following reports may be available to various user roles:

Transportation—wheel slip, time in remote mode configuration, humping time, speed violations;
Emergency Brake—occurrences and fault types;
Transponder Health—transponder misses, hits, and warnings;
RF Repeater Density—RF repeater link status and map;
Locomotive Tracking—view locomotive settings;
Operator Control Unit (OCU) Tracking—firmware version, last yard, last time used, last locomotive; and
Communications Health—Count of RF communication faults and warnings, GPS loss count and duration.

Exemplary embodiments may be used or provide for rail web-based monitoring and analytics by using a combination of reporting, alerts, and tracking features that can allow for monitoring of trends in yard operations, overseeing asset health, and taking proactive measures to keep assets and personnel safe and productive. From maintenance departments and yard managers to executives and operation owners, virtual information may be provided when and where it is needed. Exemplary embodiments may provide one or more (but not necessarily any or all) of the following example benefits:

Improved safety (e.g., alerts for unsafe operations such as speed violations and emergency brake usage, monitoring of operator behavior and equipment settings and sending of alerts to on-site supervisors for quick, technical support to ensure safe operations, etc.);
Increased productivity (e.g., analysis of equipment usage and misuse before damage occurs with operation reports, analysis of operations metrics over time to identify areas needing improvement, monitoring of operating trends such as the percentage of time in remote operation, evaluation of operator training to ensure adhererence to yard standards and FRA compliance, remote monitoring of yards and locomotive dashboards to understand yard operational issues performance in near real-time, etc.);
Simplified maintenance (e.g., remote troubleshooting to quickly resolve issues in the yard, to allow one or more yards to be monitored and optimized, alerts for potential equipment issues to quickly identify and resolve problems before they become more costly, etc.);

Quick visibility into real-time operations and trends (e.g., wheel slip occurrences, operator productivity, speed violation incidents, RF and GPS communication losses, locomotive location, locomotive dashboard, operator control unit and machine control unit statistics, transponder health, emergency break incidents, etc.);

Accessibility (e.g., monitoring of data and alerts sent via a secured website, which can provide up-to-date detailed reports on operational usage, direct connection to locomotives and viewing of live output from a locomotive virtual dashboard (LVD) for a given RCL, etc.);

Asset uptime (e.g., effective management of maintenance strategies and maximization of performance with minimal operating risk while keeping assets running at maximum capacity, the sending of alerts when problems are identified, etc.);

Reporting (e.g., design of reports to provide information to all groups in charge of ensuring yard operations run smoothly including maintenance, transportation, and engineering groups, reports that include information on operator productivity, wheel slip, speed violations, communications health, operator control unit (OCU) metrics, and emergency break incidents, etc.);

User customization (e.g., utilization of user roles to provide access to yards and reports based on customizable permissions, thereby providing flexibility to create a dynamic and efficient user experience by only providing visibility into the tools each user needs, etc.);

Alerts (e.g., delivery of event-based alerts to users directly, and tracking of alerts on the web application, etc.);

Locomotive tracking (e.g., interactive map functionality for a variety of different reports, in which locomotive location, operating status and detailed metrics may all be visible in a locomotive tracking capability, etc.); and/or Availability of a yard overview home page for which, e.g., one click may be all it takes for yard managers to get an instant snapshot of conditions in the yard. Upon logging in, a user may be taken to the home page and presented with reports and maps showing the most relevant information in one place, etc.

It should be noted, however, that although various embodiments are described with reference to RCLs and rail yard operations, the disclosure is not so limited. Aspects of the disclosure may be practiced in connection with various types of machines distributed in various types of environments, including, but not limited to, medical devices in hospitals, inventory devices in warehouses, machines that are manageable via automatic identification and data capture (AIDC) applications, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value;

nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of a device in use or operation in addition to the orientation depicted in the figures. For example, if a device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A network comprising:
a plurality of machines each having one or more sensors and/or one or more actuators, each machine having a node resident on the machine and/or in communication with the machine, each node having a network interface and configured to provide raw data from the one or more sensors and/or one or more actuators, each node having a processor and memory configured as a node agent to embed the raw data in one or more messages without reformatting the raw data, each of the one or more messages including a topic and a subtopic;
an engine configured to:
reformat the messages from the node agents without reformatting the raw data embedded in the messages;
direct the reformatted messages including the raw data to one or more user devices for use in managing activity and/or status of one or more of the plurality of the machines, wherein the one or more user devices are remote from the one or more of the plurality of the machines; and
send a message from at least one of the user devices to the node of a given machine of the plurality of the machines, for use in controlling activity and/or status of the given machine; and
a data handler in communication with the engine, the data handler configured to:
obtain the raw data included in at least one of the messages reformatted by the engine;
process the raw data into a format interpretable by an application on at least one of the one or more user devices to which the at least one of the messages is directed by the engine based on the subtopic specified in the at least one of the messages; and
send the processed data to the at least one of the one or more user devices;
wherein the engine is configured to receive the raw data included in the messages from the node agents of the plurality of machines and send the raw data via one of a plurality of channels selected based on the topics specified in the messages.

2. The network of claim 1, wherein the engine is configured to, in connection with the reformatting, preserve a binary form of the raw data.

3. The network of claim 1, wherein the engine is configured, as a broker of a publish/subscribe messaging system in which the node agents and/or one or more user applications on the one or more user devices are configured to subscribe as clients to the publish/subscribe messaging system.

4. The network of claim 3, wherein the plurality of channels include a status channel, a data channel, and an alert channel;
wherein the broker is configured to:
send, via the status channel, real-time status information associated with a remote control locomotive (RCL);
transport and/or persist, via the data channel, individual RCL event archive records; and
send, via the alert channel, real-time information to generate system alerts indicating conditions and push, via the alert channel, alerts to one or more user applications.

5. The network of claim 1, wherein the engine is further configured to communicate with each of the node agents using point-to-point communication and WebSocket protocol.

6. The network of claim 1, wherein the node agents are configured to push the messages to the engine.

7. The network of claim 1, wherein the engine is configured to push the reformatted messages to the one or more user devices.

8. The network of claim 1, wherein the data handler is configured to add units to the raw data in the message.

9. The network of claim 1, wherein the plurality of machines comprise a plurality of remotely controlled locomotives.

10. The network of claim 1, wherein one or more of the following are provided as the raw data from the one or more sensors and/or one or more actuators: GPS coordinates, velocity, velocity set point, direction, brake pressure, and throttle output.

11. A network comprising:
a plurality of machines each having one or more sensors and/or one or more actuators;
a plurality of nodes resident on and/or in communication with the machines, each node configured to provide, in a message, raw data from the one or more sensors and/or actuators of a machine associated with the node without reformatting the raw data, each message including a topic and a subtopic;

an engine configured to:
  receive the messages from the nodes;
  reformat the messages from the nodes without reformatting the raw data; and
  send the reformatted messages, such that the reformatted messages include the raw data in a format received by the engine, the engine further configured (a) to communicate with each node using a point-to-point protocol, or (b) to communicate as a broker with one or more of the nodes;

the network further comprising a data handler in communication with the engine and configured to:
  process the raw data into one or more formats interpretable by one or more user applications on one or more user devices to which the messages are directed by the engine based on the subtopics specified in the messages; and
  push the processed data to the one or more user devices;

wherein the engine is configured to receive the raw data included in the messages from the nodes of the plurality of machines and send the raw data via one of a plurality of channels selected based on the topics specified in the messages.

12. The network of claim 11, wherein each node has a network interface, and a processor and memory configured as a node agent to embed the raw data in the message without reformatting the raw data.

13. The network of claim 11, wherein the engine is configured as a broker of a publish/subscribe messaging system in which the node and/or the one or more user applications are configured to subscribe as clients to the publish/subscribe messaging system.

14. The network of claim 11, wherein the engine is configured to communicate with each node using a WebSocket point-to-point protocol.

15. The network of claim 11, wherein the engine is further configured to send a message from one of the one or more user devices to one of the nodes, for use in controlling activity and/or status of the machine associated with the node.

16. The network of claim 11, wherein the nodes are configured to push the messages to the engine.

17. A method of managing a plurality of distributed machines, the method comprising:
  embedding in a message raw data from one or more sensors and/or one or more actuators of one of the machines, the embedding performed by a node residing on and/or in communication with the one of the machines, the message including a topic and a subtopic;
  receiving the message from the node and reformatting the message without reformatting the raw data, and directing the reformatted message including the raw data to a user device, the receiving, reformatting and directing performed by an engine of a network, the engine remote from the node and the user device, the network including the node and the user device; and
  obtaining the raw data included in the message reformatted by the engine, processing the raw data into a format interpretable by an application on the user device based on the subtopic specified in the message, and sending the processed data to the user device, the obtaining, processing, and sending performed by a data handler in communication with the engine and remote from the node and the user device;
  the user device sending a message responsive as to the raw data and/or the format interpretable by the application through the engine to the node for use in controlling performance of the one of the machines;
  the engine receiving the raw data included in the message from the node and sending the raw data via one of a plurality of channels selected based on the topic specified in the message.

18. The method of claim 17, wherein the engine performs the receiving, reformatting and directing steps as a broker of a publish/subscribe message system in which an agent of the node publishes the message, and the engine, in connection with the reformatting, preserving a binary form of the raw data.

19. The method of claim 17, wherein the engine and node communicate with each other using point-to-point communication and WebSocket protocol.

20. The method of claim 17, wherein the plurality of distributed machines includes a plurality of locomotives.

* * * * *